United States Patent
Xu

(10) Patent No.: US 7,423,966 B2
(45) Date of Patent: Sep. 9, 2008

(54) PRIORITIZED COMMUNICATION BANDWIDTH-SHARING MANAGEMENT FOR PLURAL-STATION WIRELESS COMMUNICATION SYSTEM

(75) Inventor: Shugong Xu, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1119 days.

(21) Appl. No.: 10/375,483

(22) Filed: Feb. 27, 2003

(65) Prior Publication Data

US 2004/0090979 A1 May 13, 2004

Related U.S. Application Data

(60) Provisional application No. 60/424,829, filed on Nov. 7, 2002.

(51) Int. Cl.
*H04L 12/56* (2006.01)
*H04L 12/26* (2006.01)

(52) U.S. Cl. .................................. 370/230; 370/235

(58) Field of Classification Search .................. None
See application file for complete search history.

(56) References Cited

U.S. PATENT DOCUMENTS

| 6,590,865 | B1 * | 7/2003 | Ibaraki et al. ............. 370/230 |
| 2002/0075869 | A1 | 6/2002 | Shah et al. | |

FOREIGN PATENT DOCUMENTS

| EP | 1189388 | 3/2002 |
| WO | WO0171981 | 9/2001 |
| WO | WO0237754 | 5/2002 |

* cited by examiner

*Primary Examiner*—Firmin Backer
*Assistant Examiner*—Clemence Han
(74) *Attorney, Agent, or Firm*—David C. Ripma; Jon M. Dickinson; Robert D. Varitz

(57) ABSTRACT

A method and apparatus employable in a wireless, packet-based network communication system for managing transmission-limit build-up performed by participating network BSS stations, whereby, when singular ones (one only) of these stations, during a given transmission budget beacon interval, are attempting to gain access to network transmission bandwidth, they are permitted to invoke an algorithm for rapid transmission-limit build-up. Such rapid build-up is based upon allowing such a station to begin its accessing process with an elevated, initial transmission limit which is created as a relatively high percentage (preferably about 80-percent) of the last prior beacon-announced network transmission budget. If more than one such currently non-transmitting stations are simultaneously attempting anew to gain network bandwidth access, rapid build-up is not permitted, thus to minimize an otherwise possible network communication traffic jam.

4 Claims, 4 Drawing Sheets

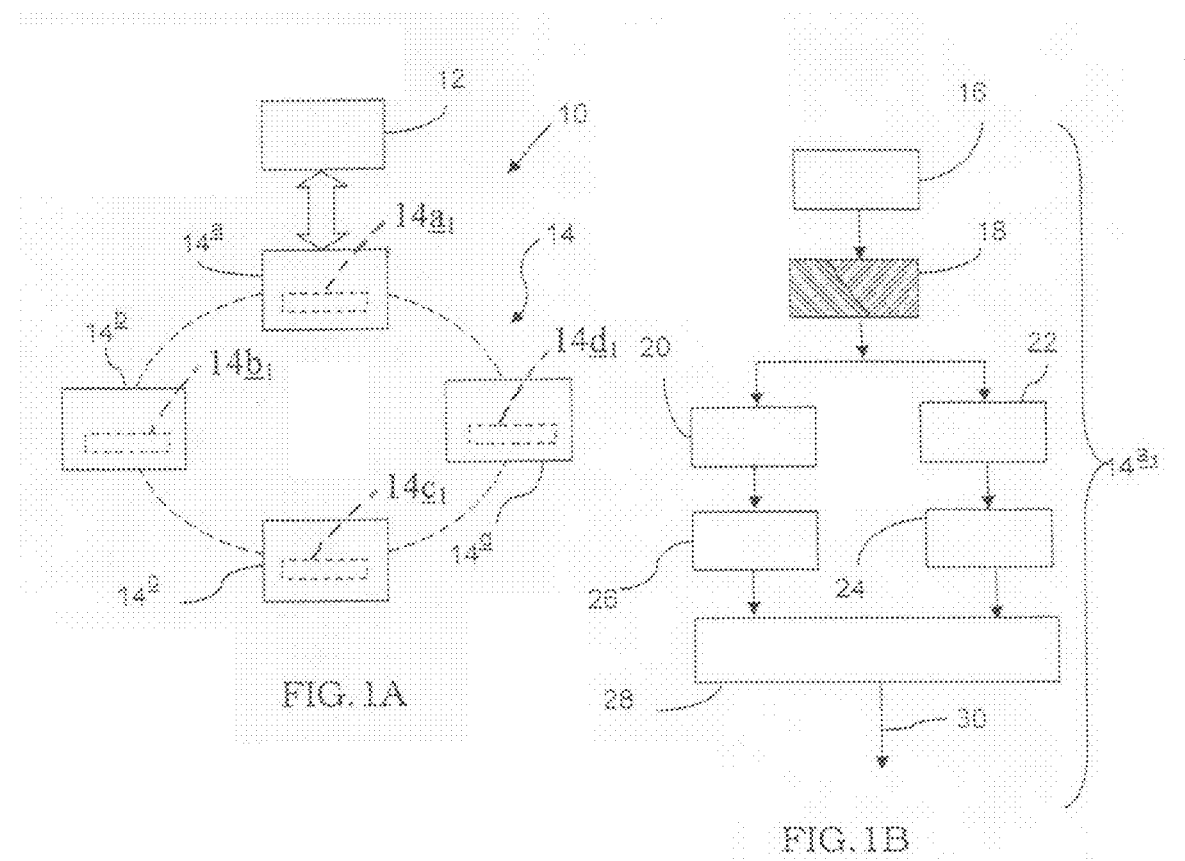
FIG. 1A
FIG. 1B
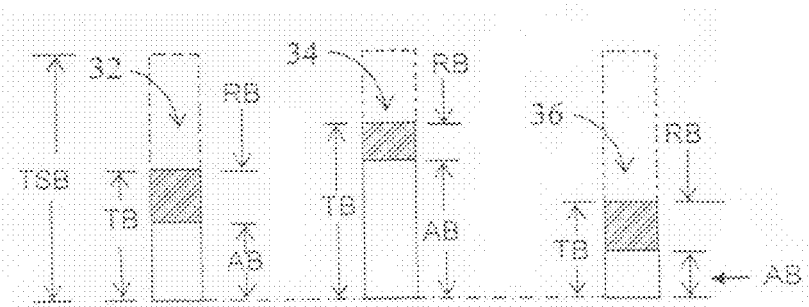
TB = TOTAL BUDGET
AB = ANNOUNCED BUDGET
RB = RESERVED BUDGET
TSB = TOTAL SYSTEM BUDGET
 FOR THIS PRIORITY CATEGORY
 OF TRANSMISSION
FIG. 2

| | AP | STATION 1 | | | STATION 2 | | |
|---|---|---|---|---|---|---|---|
| BEACON | TxBUDGET | TxCOUNTER1 | TxMEMORY | TxLIMIT1 | TxCOUNTER2 | TxMEMORY | TxLIMIT2 |
| 0 | 100 | 0 | 10 | 10 | 0 | | |
| 1 | 88 | 10 | 19 | 19 | 0 | | |
| 2 | 77.2 | 19 | 27.1 | 27.1 | 0 | | |
| 3 | 67.48 | 27.1 | 34.39 | 34.39 | 0 | | |
| 4 | 58.732 | 34.39 | 40.951 | 40.952 | 0 | | |
| 5 | 52 | 40.951 | 46.97002 | 46.97002 | 0 | | |
| 6 | 52 | 45.94117021 | 52.98596 | 52.98596 | 0 | | |
| 7 | 52 | 45.92325433 | 58.39815 | 58.39815 | 0 | | |
| 8 | 52 | 45.9713469 | 63.2749 | 63.2749 | 0 | | |
| 999 | 52 | 46.28849124 | 67.70203 | <>100 | 0 | | |
| 1000 | 52 | 41.49879154 | 71.11168 | 71.11168 | 0 | 5.2 | 5.2 |
| 1001 | 45.76 | 40.96303954 | 73.49208 | 73.49208 | 5.2 | 9.88 | 9.88 |
| 1002 | 40.144 | 46.89117781 | 75.78421 | 75.78421 | 9.88 | 14.092 | 14.092 |
| 1003 | 35.0896 | 41.57316003 | 76.70353 | 76.70353 | 14.092 | 17.8828 | 17.8828 |
| 1004 | 30.54064 | 44.91812588 | 77.47742 | 77.47742 | 17.8828 | 21.29452 | 21.29452 |
| 1005 | 26.44658 | 44.60216269 | 77.72659 | 77.72659 | 21.29452 | 24.36507 | 24.36507 |
| 1006 | 22.76192 | 45.58197176 | 77.69996 | 77.69996 | 24.365068 | 27.12856 | 27.12856 |
| 1006 | 19.44573 | 46.58956161 | 77.46528 | 77.46528 | 27.1285612 | 29.61571 | 29.61571 |
| 1006 | 16.46115 | 47.44911571 | 77.05877 | 77.05877 | 29.61570508 | 31.85413 | 31.85413 |
| 1006 | 16 | 42.89042474 | 76.09974 | 76.09974 | 31.85413457 | 34.09122 | 34.09122 |
| 1006 | 16 | 42.88666837 | 75.23617 | 75.23617 | 34.09121726 | 36.37304 | 36.37304 |
| 1006 | 16 | 45.06200225 | 74.71999 | 74.71999 | 33.61470037 | 38.3695 | 38.3695 |
| 1006 | 16 | 45.66298172 | 74.32755 | 74.32755 | 31.83408837 | 39.95264 | 39.95264 |
| 1006 | 16 | 46.27249236 | 74.04749 | 74.04749 | 33.83808507 | 41.61795 | 41.61795 |
| 1006 | 16 | 47.52404578 | 73.94563 | 73.94563 | 37.34423616 | 43.53746 | 43.53746 |
| 1006 | 16 | 41.43396184 | 73.12314 | 73.12314 | 34.62988636 | 44.9393 | 44.9393 |
| 1006 | 16 | 47.80457424 | 73.14738 | 73.14738 | 32.41423908 | 45.93508 | 45.93508 |
| 1006 | 16 | 47.93259518 | 73.18455 | 73.18455 | 33.70785333 | 46.98651 | 46.98651 |
| 1006 | 16 | 40.51813043 | 72.32827 | 72.32827 | 32.24954034 | 47.75781 | 47.75781 |
| 1006 | 16 | 46.42632535 | 72.2666 | 72.2666 | 32.63190194 | 48.49786 | 48.49786 |
| 1006 | 16 | 41.59961381 | 71.6319 | 71.6319 | 37.49789266 | 49.74782 | 49.74782 |
| 1006 | 16 | 46.4944259 | 71.64804 | 71.64804 | 37.44737377 | 50.86672 | 50.86672 |
| | 0.4 | 46.34836383 | 70.08504 | | 34.97183453 | 50.01667 | |
| 1999 | 16 | 40.41858362 | 69.52676 | 52 | 30.60032666 | 50.28704 | 50.28704 |
| 2000 | 15.52 | 40.98958639 | 69.04484 | 69.04484 | 36.07751323 | 51.13964 | 51.13964 |
| 2001 | 13.648 | 40.75134496 | 68.39532 | 68.39532 | 34.64943768 | 51.54841 | 51.54841 |

FIG.3A

| | AP | STATION 1 | | STATION 2 | | |
|---|---|---|---|---|---|---|
| 2002 | 11.9632 | 46.93640392 | 68.38447 | 68.38447 | 34.11354782 | 51.68351 | 51.68351 |
| 2003 | 10.44688 | 47.76129537 | 68.32207 | 68.32207 | 31.37248979 | 51.32455 | 51.32455 |
| 2004 | 9.082192 | 46.29541262 | 67.95353 | 67.95353 | 34.93791599 | 51.29286 | 51.29286 |
| 2005 | 7.853973 | 40.39669126 | 66.79118 | 66.79118 | 31.5954555 | 50.74043 | 50.74043 |
| 2006 | 6.748576 | 40.77004271 | 65.67932 | 65.67932 | 34.28003219 | 50.45485 | 50.45485 |
| 2006 | 5.73718 | 45.19847399 | 65.11058 | 65.11058 | 37.89781538 | 50.53247 | 50.53247 |
| 2006 | 4.858346 | 42.51945868 | 64.18769 | 64.18769 | 31.27640728 | 49.71823 | 49.71823 |
| 2006 | 4.052512 | 44.74341171 | 63.54338 | 63.54338 | 32.73703788 | 49.0801 | 49.0801 |
| 2006 | 3.32726 | 46.67033431 | 63.12221 | 63.12221 | 37.04392131 | 48.95009 | 48.95009 |
| 2006 | 2.674534 | 40.5024262 | 61.93773 | 61.93773 | 30.01835984 | 47.92474 | 47.92474 |
| 2006 | 2.087081 | 41.34038066 | 60.91351 | 60.91351 | 35.56909825 | 47.60926 | 47.60926 |
| 2006 | 1.558373 | 42.24920728 | 60.0479 | 60.0479 | 33.1553268 | 46.98281 | 46.98281 |
| 2006 | 1.082536 | 43.48798515 | 59.36993 | 59.36993 | 31.19279154 | 46.13592 | 46.13592 |
| 2006 | 0.654282 | 40.05566625 | 58.30504 | 58.30504 | 34.38881658 | 45.71441 | 45.71441 |
| 2006 | 0.4 | 41.81755201 | 57.53264 | 57.53264 | 33.86895405 | 45.24725 | 45.24725 |
| 2006 | 0.4 | 40.34255322 | 56.66049 | 56.66049 | 35.90578823 | 45.07122 | 45.07122 |
| 2006 | 0.4 | 45.39077052 | 56.48133 | 56.48133 | 30.44787037 | 44.25784 | 44.25784 |
| 2006 | 0.4 | 40.97228686 | 55.78987 | 55.78987 | 36.51983613 | 44.25444 | 44.25444 |
| 2006 | 0.4 | 43.16585246 | 55.43079 | 55.43079 | 35.5276266 | 44.13231 | 44.13231 |
| 2006 | 0.4 | 40.8834658 | 54.83372 | 54.83372 | 36.20824069 | 44.10407 | 44.10407 |
| 2006 | 0.4 | 43.06729982 | 54.55843 | 54.55843 | 35.64210204 | 44.01071 | 44.01071 |
| 2006 | 0.4 | 46.96121936 | 54.77793 | 54.77793 | 37.82599115 | 44.18876 | 44.18876 |
| 2006 | 0.4 | 40.59603282 | 54.21166 | 54.21166 | 37.32889251 | 44.28935 | 44.28935 |
| 2006 | 0.4 | 46.0132673 | 54.35209 | 54.35209 | 31.98872923 | 43.73906 | 43.73906 |
| 2006 | 0.4 | 46.31311164 | 54.51445 | 54.51445 | 32.76007255 | 43.33637 | 43.33637 |
| 2006 | 0.4 | 44.36014134 | 54.42622 | 54.42622 | 36.63870427 | 43.43937 | 43.43937 |
| 2006 | 0.4 | 45.57283622 | 54.49234 | 54.49234 | 34.51518153 | 43.27726 | 43.27726 |
| 2006 | 0.4 | 47.17734131 | 54.74439 | 54.74439 | 32.35966368 | 42.87269 | 42.87269 |
| 2006 | 0.4 | 47.2301751 | 54.97757 | 54.97757 | 31.2403124 | 42.37426 | 42.37426 |
| 2006 | 0.4 | 43.31309291 | 54.71738 | 54.71738 | 33.57609879 | 42.20597 | 42.20597 |
| 2006 | 0.4 | 40.10978638 | 54.09882 | 54.09882 | 37.90267428 | 42.57369 | 42.57369 |
| 2006 | 0.4 | 44.7892029 | 54.10364 | 54.10364 | 34.4522611 | 42.49059 | 42.49059 |
| 2006 | 0.4 | 43.20339912 | 53.91769 | 53.91769 | 36.27341804 | 42.63434 | 42.63434 |
| 2006 | 0.4 | 43.04503708 | 53.73132 | 53.73132 | 32.9997857 | 42.37088 | 42.37088 |
| 2006 | 0.4 | 42.25236531 | 53.46847 | 53.46847 | 32.17031623 | 42.03423 | 42.03423 |
| 2006 | 0.4 | 43.01777709 | 53.32376 | 53.32376 | 37.27937246 | 42.34433 | 42.34433 |
| 2006 | 0.4 | 40.65998963 | 52.91058 | 52.91058 | 33.44874157 | 42.16375 | 42.16375 |

FIG.3B

| AP | | STATION 1 | | | STATION 2 | | |
|---|---|---|---|---|---|---|---|
| 2006 | 0.4 | 40.89883394 | 52.56738 | 52.56738 | 35.13872918 | 42.20404 | 42.20404 |
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |
|  |  |  |  |  |  |  |  |

FIG.3C

PRIORITIZED COMMUNICATION BANDWIDTH-SHARING MANAGEMENT FOR PLURAL-STATION WIRELESS COMMUNICATION SYSTEM

CROSS REFERENCE TO RELATED APPLICATION

This application claims the benefit of the filing date of previously-filed U.S. Provisional Patent Application Ser. No. 60/424,829, filed Nov. 7, 2002, for "Prioritized Communication Bandwidth-Sharing Management for Plural-Station Wireless Communication System". All of the contents of this prior-filed provisional application are fully incorporated herein by reference.

GENERAL INTRODUCTION

This invention pertains to a method and apparatus employable in a wireless, packet-based network communication system for managing the access to available, unused bandwidth which is provided for plural communication stations. In particular, it relates to a setting wherein such stations seek prioritized access to such bandwidth with regard to transmitting information that is characterizable in any one of several, different, defined categories of priority. The invention specifically distinguishes how it behaves for each of these several, different communication categories, addressing each individually, but essentially performs for all such categories with certain similar important features aimed at improving the quality of service (QoS) in the traditionally error-prone environment of the usual wireless network. The description which now follows is individually applicable to each priority category.

Those generally skilled in the art in the field of this invention fully understand how conventional system communication traffic is handled, and know that bandwidth management currently does not accommodate any preferential treatment, within each priority level of traffic, for certain communication stations. This conventional behavior leads, in certain instances, to communication inefficiencies that translate into system "service" which is considered to be poor. The present invention directly addresses this issue by enabling, as will be explained, a non-conventional "offering" of preferential bandwidth-access treatment for certain stations, and by so doing, improving quality of service.

Fundamentally, the system and method of this invention effect the mentioned kind of bandwidth-access management by delivering periodic reports, called "beacons", to all of the associated, network-using stations. How this works, and why it is important are explained below.

Time-successive beacons (beacon reports) define-successive time intervals during each of which the various stations are permitted to transmit communications (typically in packets). In these beacon reports, the invention announces, as being accessible, a certain amount of available unused bandwidth (the "transmission budget"), which amount is intentionally "stated" to be less than the true, full amount. The undisclosed difference acts as a reserve of available bandwidth capacity.

In a communication system of the type generally outlined above, plural communication stations are typically organized into groups which are each referred to as a basic service set (BSS). In each such group, one among this group functions as what is know as an access point (AP), or controller, which has the direct access to the particular network with respect to which all stations in the group operate. The AP is effectively a port to the network for all stations in a BSS. Collectively, a BBS and an associated network, are referred to herein as a network communication environment.

In a regular periodic manner, the AP station broadcasts to all stations in the associated BSS the above referred to beacons. Each beacon, in accordance with the invention, advises all such stations in the BBS about the then-available, so-called transmission budget which reflects, but doesn't totally state, the amount of then-available, unused bandwidth. From beacon-to-beacon, and over time, the maximum available unused bandwidth (the transmission budget) changes in accordance immediate-prior network communication activity, and so, the amount of bandwidth which is announced to be available in each such beacon transmission will change from time-to-time, depending upon such activity. All stations within the BSS, may then compete, during the next-following interval between beacons, for such available, announced, unused bandwidth. Use of the unannounced, reserved bandwidth occurs specially, as will shortly be explained.

It is important, in relation to maximizing the quality of communication service, that existing, "currently transmitting" stations be allowed a certain deferential treatment with regard to access to available bandwidth, so that the network system does not compromise communication quality by failing either to recognize the fact that a currently communicating station (a) may need some additional bandwidth to complete transmission activity in which it is already engaged, or (b) need such additional bandwidth to deal with the possibility that a currently transmitting station has had certain recently attempted communications fail by virtue of some kind of a communication error. This difference is allowed for by the present invention wherein, as will be seen, the participating BSS stations behave in a kind of self-governing manner with regard to how they seek to access additional bandwidth. Those stations are not "currently" in the immediate above-mentioned (a) and (b) situations, and which wish to obtain transmission bandwidth during a current, new beacon interval, establish for themselves a relatively small, requestable transmission bandwidth, referred to herein as a small transmission "limit". Those stations, however, which are in at least one of these two situations are allowed to establish appropriate larger transmission "limits", thus to be self-enabled to request more of the actual additional available bandwidth, including the unannounced, reserved bandwidth.

There are thus actually available, in accordance with each beacon-transmission budget announcement, two types of unused available bandwidth, one of which is directly announced to all stations in a BSS, and the other of which is not announced to any of these stations, but which rather is held as a reserve of unannounced available bandwidth that can be accessed, for example, during the next beacon transmission, principally by any one or more of the transmitting stations which were actively transmitting during the prior beacon time period. The amount of such reserved bandwidth is based, in part, upon prior system-activity history, from which history the AP station performs a calculation (set forth below) in accordance with the invention about how much of the available unused bandwidth to announce for the transmission budget. It is this unique, "reserve budgeting" behavior which is performed by the present invention that specially enhances the earlier-mentioned quality of service.

A detailed elaboration of the invention is presented below following the descriptions of the six drawing figures.

DESCRIPTIONS OF THE DRAWINGS

FIG. 1A is a simplified, block/schematic diagram illustrating a wireless, packet-based communication system constructed, and operating in accordance with, the present invention, and which includes a basic service set (BBS) of transmitting and receiving stations, one of which is the above-mentioned AP station.

FIG. 1B illustrates, inter alia, bandwidth-sharing control sub-structure present in one of the computer stations (the AP station) shown in FIG. 1A which performs certain ones of the methodologic steps of the invention. This figure can be viewed as illustrating both structural and methodologic features of the invention.

FIG. 2 is a very simplified block diagram showing schematically, and representatively, three time-separated (though not necessarily time-sequential), transmitted beacons of available, unused bandwidth, which beacons are structured in accordance with the present invention.

FIGS. 3A, 3B and 3C (presented on three separate plates of drawings) collectively illustrate, in tabular form, the performances of the AP station, and of two other stations (labeled "Station 1" and "Station 2" in bracketed column headings), regarding the operative interrelationships, during a plurality of beacons, of announced and unannounced transmission budget levels, and the self-governing settings by the stations of respective transmission limits.

DETAILED DESCRIPTION OF THE INVENTION

Along with the description which now directly follows of the method and structure of this invention, which description is made with reference to the several drawing figures, there is a text and table-containing descriptive section below including sub-section headings "Distributed Admission Control Procedures", "Procedure at the AP", and "Procedure at the Station" (each individual station), where mathematically-involved internal behaviors of the AP and of each station are fully expressed in detail. This descriptive section, in addition to offering a short preamble statement (the first sub-section) generally describing control procedures implemented in accordance with the mechanism and practice of the present invention, describes in detail, and mathematically, how the AP station (the second sub-section) calculates a reportable transmission budget, and in text, a table and mathematics, how the individual stations (all stations) (the third sub-section) behave to self-govern their respective accesses to available transmission budget through the self-settings of respective transmission limits.

In this descriptive section, and to some extent in the preceding description material immediately below relating to the drawing figures, certain letter acronyms are employed, and the following is a substantially full list of those acronyms and of their respective meanings:

| | |
|---|---|
| AP | Access Point |
| SIF | Short Interframe Space |
| ACK | Acknowledgement |
| AC | Access Category |
| RA | Receiver |
| APMAC | Access Point Media Access Control |
| Tx Time | Transmit Time |
| PHY | Physical (Layer) |
| QoS | Quality of Service |
| MIB | Management Information Base |
| STA | Station |

Turning now to the drawings, FIG. 1A therein generally illustrates at 10 a packet-based wireless communication network environment, or system, which operates in accordance with the present invention. For illustration purposes only herein, network 10 takes the form of a Local Area Network (LAN), but it should be understood that the invention may be employed in a wide variety of error-prone communication networks. Included in environment 10 is the LAN network portion per se 12 which substantially inter-connects all inter-connected and involved users, and a single BSS group 14 of plural stations, such as stations 14a, 14b, 14c, 14d. Station 14a acts as the access point (AP) controller computer, and the other three stations are simply communicating transmitter/receiver computers which form part of this basic service set. AP 14a, in addition to being the controller computer in set 14, is also one of the several individual transmitter/receiver computer communicating stations in the set. All of the station-specific rules of operation which apply to the other stations in set 14 also apply to station 14a. It is station 14a, however, which is responsible for transmitting the beacons mentioned earlier, wherein transmission budget announcements are prepared and communicated to all of the communicating stations in the set. As is set forth in description below, AP 14a has some additional performance rules to follow in accordance with the structure and practice of the invention.

One should envision the several blocks that represent communication stations in BSS 14 in FIG. 1A to have appropriately contained within them, via hardware, firmware and software, the appropriate structures that will be, and are, employed in accordance with practice of the present invention to control bandwidth access. Dashed lines within these blocks symbolize these structures. Very specifically, pictured in dashed block form within computers, or stations, 14a, 14b, 14c, 14d, are structures 14a1, 14b1, 14c1, and 14d1, respectively. These structures perform within these respective stations the task of self-establishing respective transmission limits, which limits are, and will be, self-imposed limits. Dashed block 14a1 in station 14a further represents structure, and methodology performed, within this AP station that controls the special bandwidth beacon broadcasts that are provided in system 10 to all stations 14a, 14b, 14c, 14d. FIG. 1B in the drawings illustrates more fully this structure and methodology.

Directing attention now specifically to FIG. 1B, previously mentioned block 14a1 includes blocks, 16, 18, 20, 22, 24, 26 and 28 which are functionally and physically operatively interconnected as shown. From a structural point of view, these blocks collectively constitute what is referred to herein as bandwidth-sharing control sub-structure. These blocks specifically picture schematically the structure, and certain methodology performed thereby, which is referred to in the "Characterization of the Invention" section of the above-referenced, priority U.S. Provisional Patent Application.

Block 16, also referred to herein as first componentry, determines, for each one of successive, time-spaced intervals between beacon transmissions, a maximum available transmit budget relating to expected, available, unused network bandwidth. Block 18, also referred to as second componentry herein, based upon the performance of block 16, establishes a two-part component-division (see the two differently shaded areas within block 18) of the determined maximum available budget. Blocks 20, 22, which collectively constitute third componentry herein, characterize respective different ones of these two-part component-divisions as being (a) reserve-available bandwidth (block 20), and (b) non-reserve-available bandwidth (block 22). Block 24, also referred to herein as fourth componentry, prepares for broadcast, in each of the mentioned time intervals, of a beacon to all stations announcing the availability to all, in the next successive time interval, of only the non-reserve-available bandwidth component-division. Block 26, referred to herein also as fifth componentry, reserves the unannounced, reserve-available bandwidth component-division for access and use, in the next successive time interval, principally only by that or those station(s) which are engaged in transmission communication during the current time interval, Finally, block 28, known also herein as sixth componentry, specifically controls, via communication path 30, delivery and use of all available transmission budget (bandwidth) by requiring, of the individual stations, the self-governing of demands for available bandwidth through self-implementation of the earlier mentioned, self-established transmission limits.

Distributed Admission Control Procedures

The amount of on-air time for transmissions of a specific access category (AC) is capped with a hysteresis based distributed admission control mechanism. When the transmission budget for an AC is depleted, new nodes will not be able to gain transmission time, while existing nodes will not be able to increase the transmission time that they are already using. This mechanism protects existing flows.

Procedure at the AP

The AP shall measure the amount of time occupied by transmissions for each AC during the beacon period, including associated SIFS and ACK times if applicable. The AP shall maintain a set of counters TxTime[AC], which shall be set to zero immediately following transmission of a beacon. For each Data frame received by the AP with the RA equal to the AP MAC address, or transmitted by the AP, and which has a nonzero AC, the AP shall add to the TxTime counter corresponding to the AC of that frame, a time equal to:

a) The time on-air of the frame, including the preamble and PHY header, if the acknowledgement policy is set to "no acknowledgement".

b) The time on-air of the frame, including the preamble and PHY header, plus the duration of the acknowledgement frame and aSIFSTime if the acknowledgement policy is set to "acknowledge".

The AP shall transmit in each beacon the TxBudget for each AC contained in the QoS Parameter Set element. The TxBudget is the additional amount of time available for an AC during the next beacon period. The AP shall set the TxBudget to be:

$$TxBudget[AC]=MAX\{(aACTransmitLimit[AC]-TxTime[AC]*f[AC]), 0.0\}$$

The variable aACTransmitLimit[AC] is a MIB variable at the AP for the maximum amount time that may be spent on transmissions of a specific AC, per beacon interval. This value should be scaled to aDot11BeaconPeriod. If no admission control is applied (for a specific AC), the TxBudget shall be set to 32767, which is deemed to be infinity. Factor $f[AC]$ is a MIB variable at the AP, which is the surplus factor for a specific AC. Normally this factor is greater than 1.0 and gives more bandwidth reservation for the existing flows. This parameter is distributed to STAs by QoS Parameter Set element. If TxBudget[AC] becomes nagative, it will be set to zero.

Procedure at the Station

Stations, including the AP, shall maintain four variables for each of AC, as shown in Table I.

TABLE I

Admission Control variables at the station

| State Variable | Description |
|---|---|
| TxCounter | Counts the transmission time during this beacon interval, not including unsuccessful transmission if the transmission status is available; |
| TxUsed | All transmission time used. |
| TxLimit | Limits the counter |
| TxRemainder | Stores a possibly capped limit remainder |
| TxMemory | Memorizes the limit |

The variable TxCounter counts the amount of time occupied on-air by transmissions from this station for each specific AC, including associated SIFS and ACK times if applicable. For each data frame transmitted by the station which has a nonzero AC, no matter whether this frame successfully transmitted or not, the station shall add to the TxUsed[AC] corresponding to the AC of the frame, a time equal to:

a) The time on-air of the frame, including the preamble and PHY header, if the acknowledgement policy is set to "no acknowledgement";

b) The time on-air of the frame, including the preamble and PHY header, plus the duration of the acknowledgement frame and aSIFSTime if the acknowledgement policy is set to "acknowledge".

At the same time, the station maintains another counter, TxCounter[AC], which counts only the successful transmission if the status is known by the station. The station shall not transmit a data frame if doing so would result in the value in TxUsed[AC] exceeding the value in TxLimit[AC]. If the station is prevented from sending a frame for this reason, it may carry over the partial frame time remainder to the next beacon period, by storing the remainder in TxRemainder[AC]:

$$TxRemainder[AC]=TxLimit[AC]-TxUsed[AC]$$

Otherwise, TxRemainder[AC] shall be zero.

At each target beacon transmission time, irrespective of whether a beacon was actually received, the TxMemory, TxLimit and TxCounter state variables are updated according to the following procedure:

If TxBudget[AC]=0, TxMemory[AC] remain unchange; otherwise, $$TxMemory[AC]=f \times TxMemory[AC]+(1-f)(TxCounter[AC]*f[AC]+TxBudget[AC])$$

$$TxCounter[AC]=0$$

$$TxLimit[AC]=TxMemory[AC]+TxRemainder[AC]$$

Where the damping factor f is the MIB parameter dot11TXLimitDamping Factor[AC], which has a default value of 0.9. Damping does not affect the entrance of a new flow into the system when enough budget is available, because the decreased TxBudget is offset by an increased TxCounter instantaneously, so TxMemory does not change. The damping does affect TxMemory when a new flow starts up in another node. In that case, the decreased TxBudget is not offset by an increased TxCounter and the TxMemory will converge to the lower target value consequently.

The TxBudget that is used in this calculation shall be the budget that was most recently obtained from the AP. The TxCounter value shall be the value of the beacon period before the period that just ended (i.e. if the beacon period that just ended has index k, then TxCounter(k−1) shall be used in the calculation, instead of TxCounter(k)). Taking the earlier value accounts for the delay that occurs between the moment at which the AP determined the TxBudget and the point at which this budget will be used in the above calculations.

The value TxCounter+TxBudget is the target to which TxMemory converges. The TxLimit is equal to TxMemory plus a possible capped remainder.

TxMemory 'memorizes' the amount of resource the node has been able to spend in a specific AC. Once the budget is depleted (i.e. TxBudget hovers around 0), TxMemory converges to TxCounter, which is the lower limit. This ensures that the node will be able to continue consuming the same amount of resource in following beacon periods. The damping allows for some amount of fluctuation to occur. But TxMemory will not be able to grow any further in the saturated state. This prevents new flows from entering the specific AC when it is saturated.

Distributed Admission Control should be used for ACs with traffic that is rate capped, like video or voice.

FIG. 2 in the drawings, viewed along with the other descriptive contents herein, illustrates how beacon-transmitted transmission budgets that are constructed in accordance with the present invention effectively and efficiently manage station access to available network system communication bandwidth.

As was mentioned in the description of FIG. 2, there are here shown, as upright, solid-outline blocks 32, 34, 36, three time-spaced beacon-transmissions of available transmission budget, which transmissions are not necessarily directly in contiguous sequence in time. Dash-dot horizontal lines which extend between blocks 32, 34, 36 are employed to indicate this condition of time separation, yet not necessarily time direct sequence. In each of beacons 32, 34, 36, these respective, transmitted transmission budgets have their sizes reflected in the respective overall heights of the blocks. These budgets have been calculated by AP 14a to be the appropriate, available transmission budgets, in total. Within that total budget, the unshaded area represents the actual amount of transmission budget which is announced to all stations in BSS 14 by AP 14a, and the shaded regions indicate reserved bandwidth which is created, in accordance with the invention. Such reserved and unannounced available bandwidth allows "currently transmitting stations", that is, those stations which may have been engaged in transmitting in the last preceding interval between two successive beacon transmissions, and which may need additional bandwidth, either (a) to complete the full list of transmission activities which have not fully been completed, or (b) to have the opportunity to correct prior failed attempts at transmission, and thus to obtain deferential access to additional bandwidth.

The same-height, dashed-line block outlines which are illustrated in FIG. 2 in association with each of blocks 32, 34, 36 represent total system bandwidth which is provided for the particular, single, priority category of transmission which is now being discussed for illustration purposes.

As was pointed out earlier, and as has just been re-emphasized, the description which is now under way with respect to three beacon-transmissions of transmission budget pictured in FIG. 2, is being presented in the context of a single priority category of information communication in network environment 10. The very same kind of representative operational "picture" is true with respect to each of the several predetermined categories of transmission priority which environment 10 is designed to handle with respect, at least, to BSS 14.

Effectively what takes place is that AP 14a is aware of the amount of bandwidth which was actually employed in the last preceding transmission period (interval between beacons), and from this amount, it prepares an announcement for the next successive beacon transmission of an available transmission budget which is somewhat less than this full amount. How AP 14a arrives at the transmittable amount of available transmission budget is expressed above in the descriptive text which is in the previously mentioned sub-section entitled "Procedure at the AP".

At the same time, each of the individual stations in BSS 14, including controller station 14a, prepares for its own use, so-to-speak, and during each transmission interval between beacons, a transmission limit with respect to the amount of bandwidth that it will possibly request during the impending, next-successive transmission interval between adjacent beacons. The specific operations of the various transmitting stations that are undertaken to create this calculation of a respective transmission limit is expressed in text, table, and mathematical formats above in the descriptive text which is in the previously mentioned sub-section entitled "Procedure at the Station". This activity on the part of the individual communication stations is a self-governing activity which determines how stations that wish to compete for just-announced available transmission budget will do so, with the recognition that those with lower-value transmission budgets will effectively be competing in a slightly disadvantageous way with respect to those stations which are permitted to establish larger individual transmission budgets. These larger-transmission limit settings are settings which are provided by and within the respective stations that were transmitting in the last transmission interval, and are permitted and encouraged by the present invention in order to allow for a preferential opportunity to certain stations to obtain additional bandwidth drawn from a reserve amount which has not been announced.

Thus the novel structure and method of this invention offer a significant and unique way of improving quality of service in a network communication system, or environment, of the type which has been generally described herein. They do so by controlling bandwidth announcements of availability in a manner which preserves an unannounced reserve of bandwidth that is made available in successive beacon periods of transmission budget announcements principally to currently transmitting computers in the systems, so as to protect integrity of their transmissions, as has been outlined above. Variations and modifications certainly can be made to implement this unique bandwidth-reserve approach in many different kinds of settings well appreciable by those generally skilled in the art.

I claim:

1. A method for managing, within a group of plural communication stations in a wireless communication network, bandwidth-sharing of available, unused bandwidth, said method comprising determining, for each of successive, time-spaced respectively current time intervals, a maximum available transmit budget relating to expected, available, unused bandwidth, establishing a two-part component-division of the maximum budget, characterizing one of the two component-division parts as a reserve-available bandwidth component-division, and the other part as a non-reserve-available bandwidth component-division, broadcasting, in each of the mentioned respectively current time intervals, a beacon to all stations in the group, announcing the availability to all, in a next, associated, successive time interval, of only the non-reserve-available bandwidth component-division, reserving the unannounced reserve-available bandwidth component-division for access and use, in the mentioned next, associated, successive time interval, preferentially by only the station(s) which is/are engaged in transmission communication during the respectively current time interval which precedes the mentioned next, associated, successive time interval, and specifically controlling delivery and use of all available transmission budget by requiring, of individual communication stations, self-governing of demands for available bandwidth through self-established transmission-limits which are larger for the stations that are currently transmitting, and smaller for all other stations.

2. A method for managing, within a group of plural communication stations in a wireless communication network, bandwidth-sharing of available, unused bandwidth, said method comprising establishing periodic beacon transmissions of bandwidth availability announcements to stations in the network, as a part of said establishing, controlling the content of the mentioned announcements in a manner which involves preservation preferentially for the use of currently-transmitting network stations, of an unannounced reserve of bandwidth, and by said establishing and controlling steps, protecting the communication quality of transmissions of the mentioned currently-transmitting stations.

3. The method of claim 2, which further comprises enabling each participating station in the network to self-establish a respective transmission limit, with the mentioned currently-transmitting stations being permitted to establish a larger limit than that which is permitted for non-currently-transmitting stations, and affording preferential use access to announced, reserved bandwidth to those stations currently possessing the larger self-established transmission limits.

4. Apparatus for managing, within a group of plural communication stations in a wireless communication network, bandwidth-sharing of available, unused bandwidth, said apparatus comprising a computer which is included as one of the stations in the mentioned group of stations in the network, and bandwidth-sharing control sub-structure organized within said computer and including (a) first componentry for determining, for each of successive, time-spaced time intervals, a maximum available transmit budget relating to expected, available, unused bandwidth, (b) second componentry operatively connected to said first componentry and structured to establish a two-part component-division of the maximum available transmit budget, (c) third componentry operatively connected to said second componentry and structured to characterize one of such two component-division parts as a reserve-available bandwidth component-division part, and the other component-division part as a non-reserve-available bandwidth component-division part, (d) fourth componentry operatively connected to said third componentry, constructed to broadcast, in each of such time-spaced time intervals, a beacon to all stations in the group in the network, announcing the availability to all, in the next successive time interval relative to a current time interval, of only the non-reserve available bandwidth component-division part, (e) fifth componentry operatively connected to said third componentry and constructed to reserve the unannounced reserve-available bandwidth component-division part for access and use, in the next successive time interval, principally only by the station(s) which is/are engaged in transmission communication during the mentioned current time interval, and (f) sixth componentry operatively connected to said fourth and fifth componentries, constructed specifically to control delivery and use of all available transmission budget by requiring, of individual communication stations in the group in the network, self-governing of their respective demands for available bandwidth through the creation and implementing of self-established transmission-limits, which limits are larger for those stations that are currently transmitting, and smaller for all other stations.

\* \* \* \* \*